March 8, 1932. J. W. MOTHERWELL 1,848,489
PRESSURE GAUGE
Filed Feb. 1, 1926 2 Sheets-Sheet 1

Inventor:
Joseph W. Motherwell
by George A. Rockwell,
Atty.

March 8, 1932. J. W. MOTHERWELL 1,848,489
PRESSURE GAUGE
Filed Feb. 1, 1926 2 Sheets-Sheet 2
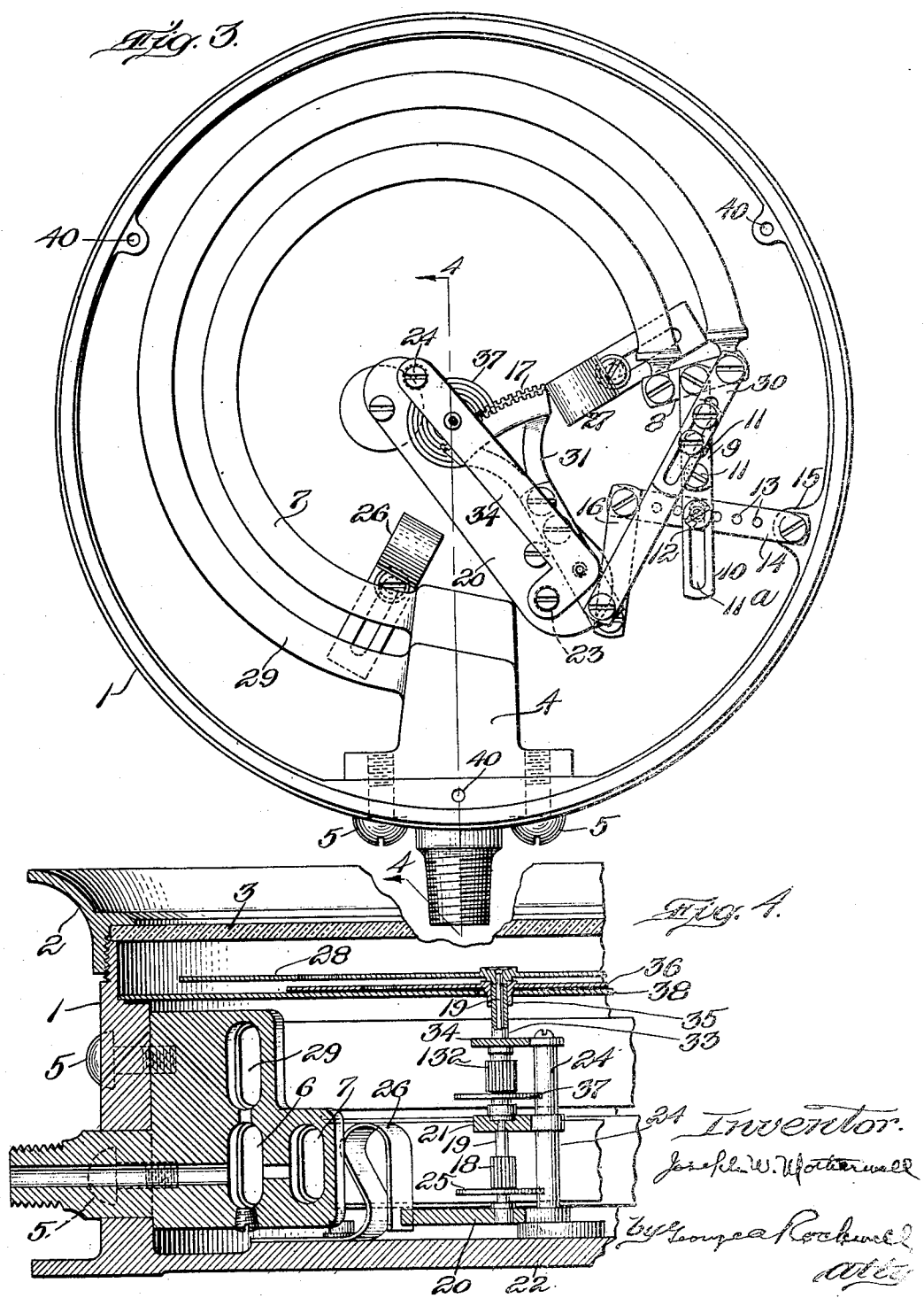

Patented Mar. 8, 1932

1,848,489

UNITED STATES PATENT OFFICE

JOSEPH W. MOTHERWELL, OF MELROSE, MASSACHUSETTS, ASSIGNOR TO THE ASHTON VALVE COMPANY, OF CAMBRIDGE, MASSACHUSETTS, A CORPORATION OF MASSACHUSETTS

PRESSURE GAUGE

Application filed February 1, 1926. Serial No. 85,253.

The principal object of my invention is to enable the user of the gauge to maintain uniform pressure and maximum efficiency and this is accomplished by providing means which give a readily visible warning or indication of the rise or fall of the pressure so that, for example, the engineer or fireman on a locomotive or in a boiler room may readily see the widely spaced graduation marks of working pressure and instead of allowing steam, for example, to be wasted by escape through a safety valve he may act in time to prevent such waste. This he may do by putting on his injectors or boiler feed pump or he can cut down the supply of coal on locomotives equipped with mechanical stokers. On fuel oil fired locomotives he can cut down the supply of fuel oil. In other words the operator can see readily and act quickly to maintain efficiency which is greatest when the pressure is at a predetermined point and consequently it is desirable to maintain the pressure as near such predetermined point as possible.

A feature of my invention is the provision in one gauge of two separately movable indicators, both of which are actuated by a single source of pressure and one of which, in the preferred form, gives readily visible indication for a range of 10 or 15 lbs. above and below the point of maximum pressure while the other gives indication for the entire range of pressure.

Another feature is the provision of a plurality of Bourdon tubes to operate one indicator and a single tube to operate the other indicator all of the tubes being, at their fixed ends, connected to one socket.

Another feature is that one indicator moves much faster than the other, the faster moving indicator cooperating with a scale having relatively large spaces between the unit marks of pressure.

Other features will be pointed out below.

In the drawings

Figure 3 is an elevation like Figure 1 but with the dial and retaining ring removed; and Figure 4 is a section on line 4—4 of Figure 3.

Figure 1:
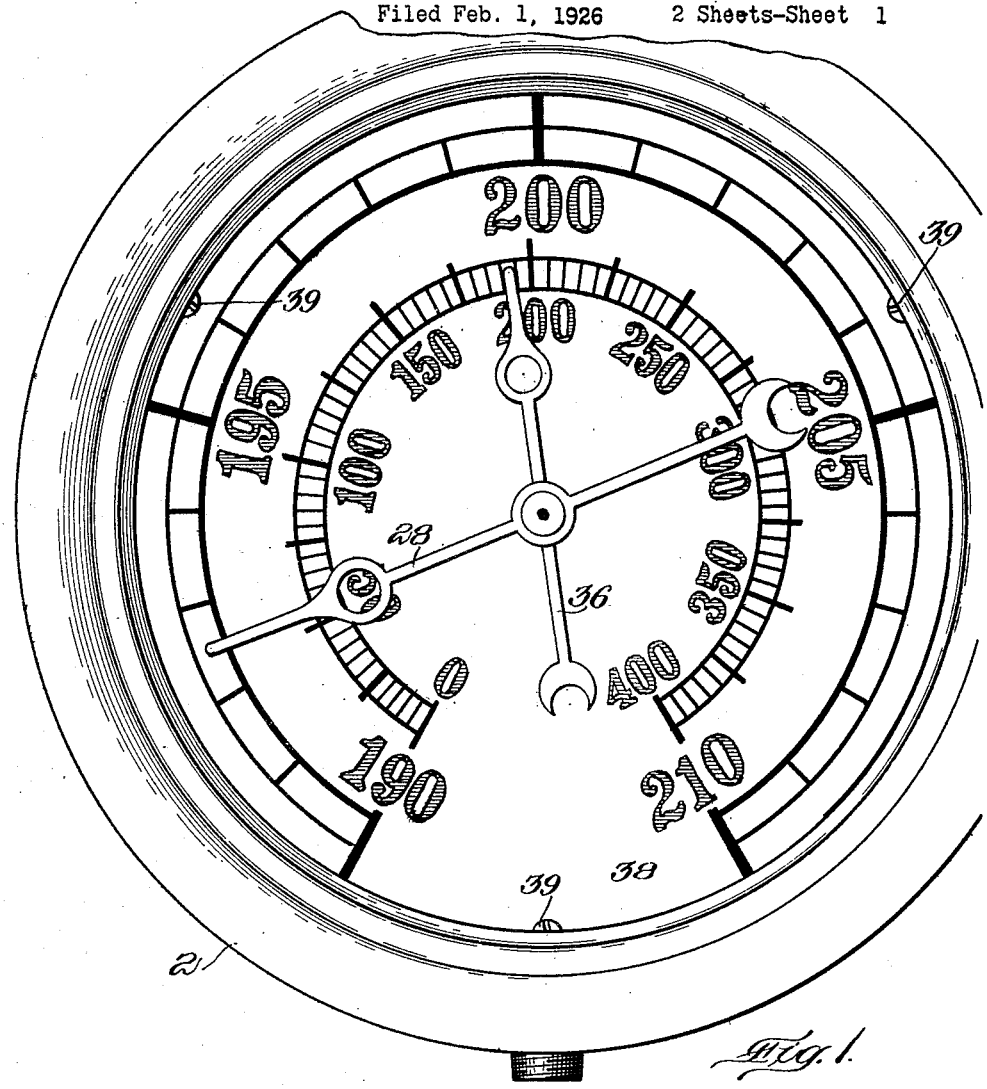
Figure 1 is a front elevation of a gauge embodying my invention.
Figure 2:
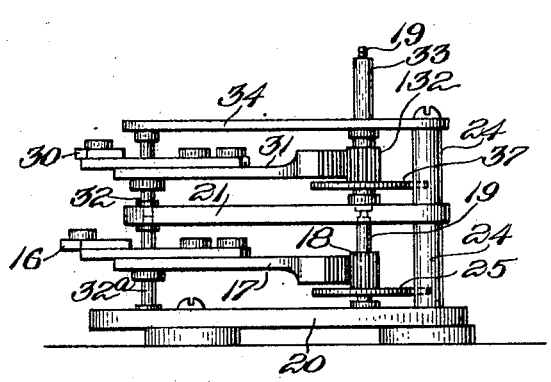
Figure 2 is an elevation of the operating mechanism described below.
Figure 5:
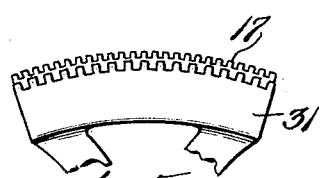
Figure 5 is an enlarged detail of portions of the two sectors.

The casing 1 is externally threaded to engage the internal threading of the retaining ring or cover 2, which holds in place the usual glass plate 3.

The socket 4 is held to the annular wall of the casing by screws 5 and has an extension outside of the casing and threaded to engage any suitable conduit (not shown) leading from the source of pressure, such as boiler pressure.

Rigidly connected to the socket, and conducting pressure therefrom, are two concentric Bourdon tube springs, 6 and 7, the movable end of spring 6 being closed and having pivotal connection with one end of link 8, the movable end of spring 7 being also closed and having pivotal connection with the other end of link 8, the latter, near its center, having pivotal connection with a link which comprises two members 9 and 10 adjustably held together by screws 11. The member 10 is slotted at 11a to permit movement therein of screw 12, the length of the slot below screw 12 governing the amount of take up and screw 12 engaging the desired perforation 13 in link 14 to give adjustability. Link 14 is pivoted at one end to a lug 15 and at the other end to link 16, the latter being pivotally connected to one end of sector 17 fixed to shaft 32a and having very fine teeth to engage the fine teeth of pinion 18, which is fixed to shaft 19, the latter being mounted to rotate in the plates 20 and 21, plate 20 being suitably fixed to the wall 22 of the casing and plate 21 being supported by posts 23, 24 fixed to said plate 20. The usual coiled spring 25 is connected at one end to shaft 19 and tends to return it to normal position, the other end of spring 25 entering a hole in post 24 and being wedged therein by a small pin. Spring buffers 26 and 27 are suitably fixed to wall 22, one acting to limit the movement of sector 17 in one direction and the other limiting its movement in the other direction, principally to prevent the sector from getting out of mesh with pinion 18. The indicator 28 has a central perforation to frictionally engage the reduced top portion of shaft 19 so as to oscillate with the latter.

Bourdon tube spring 29 is rigidly connected to socket 4 and conducts pressure therefrom and at its movable end is closed and is pivotally connected with one end of link 30, the other end of said link 30 being pivotally connected with sector 31, which is mounted to oscillate with shaft 32. Sector 31 has relatively large teeth to engage the relatively large teeth of pinion 132 which is of greater diameter than pinion 18 and which is fixed to tubular shaft 33 mounted to rotate in plates 21 and 34, this tubular shaft permitting free rotation within it of shaft 19, the latter moving at a much faster rate than shaft 33. The tubular shaft 33 extends well above plate 34 and near its top is frictionally and exteriorly engaged by a bushing 35 rigidly connected with indicator 36 so that this indicator oscillates with shaft 33. Coiled spring 37 is suitably connected at one end to shaft 33 and tends to return the latter to normal position, the other end of spring 37 entering a hole in post 24 and being wedged therein by a small pin.

The use of the two Bourdon springs having their movable ends pivotally connected ensures great power and great accuracy which is especially important in connection with the relatively rapid moving indicator 28. The mounting of the indicators 28 and 36 to oscillate on the same axis provides compactness and also provides for concentricity of the scales as will be more fully explained below.

The dial 38 may have perforations to receive screws 39, the latter engaging threaded portions 40 on the casing. The dial is provided, in the form shown, with a circular scale marked for boiler pressure from 0 to 400 pounds and indicator 36 cooperates with this scale, the dial being also provided with a suppressed scale, concentric with the other scale, the indicator 28 cooperating with this suppressed scale, which indicates working pressure from 190 to 210 lbs. or approximately 10 lbs. above and below the predetermined pressure of maximum efficiency which is approximately 200 lbs. The space on the outer scale for one pound of pressure is twenty times that for one pound on the inner scale and consequently the user may readily see at a considerable distance a change of one pound on the outer scale and may act quickly if necessary as above explained.

The faster travel of the outer end of indicator 28 is partly provided for by the relatively small diameter of pinion 18 and because said end is farther from the axis than the outer end of indicator 36 and also because of the large deflection of springs 6 and 7 and because of the multiplying mechanism.

It will now be clear that I provide two separately movable indicators and separate scales to cooperate therewith, the indicators being operated from a single source of pressure, the indicator 28 remaining idle while screw 12 is riding in slot 11a and commencing its indication when the lower end of slot 11a engages screw 12, the adjustment being such that this engagement will occur when the pressure is 190 lbs.

What I claim is:

1. A gauge comprising a dial marked with a full scale and a suppressed scale, both scales indicating, within limits, the same pressure; an indicator cooperating with said full scale marking; means including a Bourdon tube to operate said indicator; another indicator cooperating with said suppressed scale marking; and means, including a greater number of Bourdon tubes than is included in the first-mentioned means, to operate said other indicator at a faster rate than the first-mentioned indicator, the fixed ends of all of said tubes being connected with the same source of pressure.

2. A gauge comprising a dial marked with a full scale and a suppressed scale, both scales indicating, within limits, the same pressure; an indicator cooperating with said full scale marking; means including a Bourdon tube to operate said indicator; another indicator cooperating with said suppressed scale marking; and means, including a greater number of Bourdon tubes than is included in the first-mentioned means, to operate said other indicator at a faster rate than the first-mentioned indicator, the fixed ends of all of said tubes being connected with the same source of pressure; and a single socket to conduct said pressure to said fixed ends.

3. A pressure gauge comprising a dial marked with a scale indicating the complete range of boiler pressure and marked with another scale concentric with the first-mentioned scale, said other scale marking indicating the range of working pressure; an indicator cooperating with the first-mentioned scale marking; another indicator cooperating with the second-mentioned scale marking, said other indicator being mounted on the same axis as the first indicator, but movable separately therefrom; and means to actuate said indicators from a single source of pressure.

4. A gauge comprising a dial marked with a full scale and a suppressed scale, both scales indicating, within limits, the same pressure; an indicator cooperating with said full scale marking; means, including a Bourdon tube, to move said indicator in accordance with all increases and decreases in pressure within the full scale limits; another indicator cooperating with said suppressed scale marking; means, including a greater number of Bourdon tubes than is included in the first-mentioned means, to move said other indicator in accordance, but only within the limits of the suppressed scale marking with all increases and decreases in pressure but at a faster rate than the first indicator, both of said means being actuated by a single source of pressure, said tubes being of substantially the same length and being concentric; and a single socket to conduct said pressure to both of said means.

JOSEPH W. MOTHERWELL.